(12) United States Patent
Takahashi

(10) Patent No.: US 11,036,570 B2
(45) Date of Patent: Jun. 15, 2021

(54) DEVICE MANAGEMENT SYSTEM AND DEVICE MANAGEMENT APPARATUS

(71) Applicant: KYOCERA DOCUMENT SOLUTIONS INC., Osaka (JP)

(72) Inventor: Minoru Takahashi, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/908,983

(22) Filed: Jun. 23, 2020

(65) Prior Publication Data

US 2020/0409777 A1   Dec. 31, 2020

(30) Foreign Application Priority Data

Jun. 27, 2019 (JP) .............................. JP2019-119953

(51) Int. Cl.
| | | |
|---|---|---|
| G06F 11/00 | (2006.01) | |
| B65H 7/14 | (2006.01) | |
| G06F 11/07 | (2006.01) | |

(52) U.S. Cl.
CPC ............. *G06F 11/008* (2013.01); *B65H 7/14* (2013.01); *G06F 11/079* (2013.01); *G06F 11/0733* (2013.01)

(58) Field of Classification Search
CPC .. G06F 11/0733; G06F 11/008; G06F 11/079; B65H 7/14
See application file for complete search history.

(56) References Cited

U.S. PATENT DOCUMENTS

| | | | | | |
|---|---|---|---|---|---|
| 5,166,934 A | * | 11/1992 | Tomiyama | ............. | G03G 15/55 714/26 |
| 5,303,005 A | * | 4/1994 | Takano | ............... | G06F 11/0733 399/11 |
| 2002/0171699 A1 | * | 11/2002 | Choi | ...................... | B41J 29/393 347/19 |

(Continued)

FOREIGN PATENT DOCUMENTS

| | | |
|---|---|---|
| EP | 1126391 A2 | 8/2001 |
| JP | 2007323148 A | 12/2007 |

(Continued)

OTHER PUBLICATIONS

European Patent Office, European patent search report dated Nov. 30, 2020.

*Primary Examiner* — Jonathan D Gibson
(74) *Attorney, Agent, or Firm* — Li & Cai Intellectual Property (USA) Office

(57) ABSTRACT

A device management apparatus includes a storage device configured to store a number of fed sheets in an early failure period, the number of fed sheets in the early failure period being a certain number of fed sheets and being a preset number of fed sheets, which is treated as an early failure where the maintainable component has a failure, and calculates a failure density depending on a number of fed sheets based on a number of fed sheets at a time when a failure occurred in the component, which is received from the multiple image forming apparatuses, and outputs information about replacement of the maintainable component based on the failure density to the number of fed sheets in the early failure period from a number of fed sheets at a time when the parameter exceeds the threshold after an operation, which is received from one image forming apparatus.

4 Claims, 5 Drawing Sheets

(56) References Cited

U.S. PATENT DOCUMENTS

| | | | | |
|---|---|---|---|---|
| 2005/0157325 A1* | 7/2005 | Choi | | G06F 3/1224 358/1.14 |
| 2005/0262394 A1* | 11/2005 | Yasukawa | | G06F 11/0733 714/23 |
| 2006/0152754 A1* | 7/2006 | Boyd | | G06F 11/0733 358/1.15 |
| 2006/0168475 A1* | 7/2006 | Segers | | G06F 11/079 714/25 |
| 2007/0014614 A1* | 1/2007 | Yoshida | | H04N 1/32635 400/62 |
| 2007/0263255 A1* | 11/2007 | Johnson | | H04N 1/00061 358/2.1 |
| 2008/0126860 A1* | 5/2008 | Sampath | | H04N 1/00413 714/25 |
| 2011/0002000 A1* | 1/2011 | Tomaru | | G06F 11/079 358/1.14 |
| 2013/0067266 A1* | 3/2013 | Gearing | | G07C 3/02 714/4.1 |
| 2016/0380847 A1* | 12/2016 | Ueda | | G06F 11/0733 709/224 |
| 2018/0089016 A1* | 3/2018 | Tachibana | | G06F 11/0769 |
| 2018/0109413 A1* | 4/2018 | Ito | | H04L 67/325 |
| 2018/0267451 A1* | 9/2018 | Hirano | | G03G 15/5012 |
| 2019/0272209 A1* | 9/2019 | Yeung | | G06F 11/0733 |
| 2019/0279057 A1* | 9/2019 | Yeung | | H04N 1/32662 |
| 2020/0409777 A1* | 12/2020 | Takahashi | | G06F 11/079 |

FOREIGN PATENT DOCUMENTS

| | | |
|---|---|---|
| JP | 2018187776 A | 11/2018 |
| JP | 2019018990 A | 2/2019 |

* cited by examiner

DEVICE MANAGEMENT SYSTEM AND DEVICE MANAGEMENT APPARATUS

CROSS-REFERENCE TO RELATED PATENT APPLICATION

This application claims the benefit of Japanese Priority Patent Application JP 2019-119953 filed Jun. 27, 2019, the entire contents of which are incorporated herein by reference.

FIELD OF THE DISCLOSURE

The present disclosure relates to a device management system including multiple image forming apparatuses. Further, the present disclosure relates to a device management apparatus that communicates with the multiple image forming apparatuses.

FIELD OF THE DISCLOSURE

An image forming apparatus has a component which should be replaced according to its lifetime. Such a component will be hereinafter referred to as a "maintainable component".

SUMMARY OF THE DISCLOSURE

It is desirable that a maintainable component should be replaced at appropriate timing.

According to the present embodiment, there is provided a device management system, including:
multiple image forming apparatuses; and
a device management apparatus communicably connected to the multiple image forming apparatuses via a network,
  the image forming apparatus including
    a maintainable component being a replaceable component,
    a storage device configured to store a threshold of a parameter, the parameter being obtained after an operation, where an operation about the maintainable component is treated as a normal operation, and
    a communication device configured to, where the parameter exceeds the threshold after an operation and where the maintainable component has a failure, send a cumulative number of fed sheets at that time to the device management apparatus,
  the device management apparatus including
  a storage device configured to store a number of fed sheets in an early failure period, the number of fed sheets in the early failure period being a certain number of fed sheets and being a preset number of fed sheets, which is treated as an early failure where the maintainable component has a failure, and
  a controller circuitry configured to
    calculate a failure density depending on a number of fed sheets based on a number of fed sheets at a time when a failure occurred in the maintainable component, which is received from the multiple image forming apparatuses, and
    output information about replacement of the maintainable component based on the failure density to the number of fed sheets in the early failure period from a number of fed sheets at a time when the parameter exceeds the threshold after an operation, which is received from one image forming apparatus.

According to the present embodiment, there is provided a device management apparatus, including:
a communication device configured to communicably connected to an image forming apparatus via a network,
  the image forming apparatus including
    a maintainable component being a replaceable component,
    a storage device configured to store a threshold of a parameter, the parameter being obtained after an operation, where an operation about the maintainable component is treated as a normal operation, and
    a communication device configured to, where the parameter exceeds the threshold after an operation and where the maintainable component has a failure, send a cumulative number of fed sheets at that time to the device management apparatus;
a storage device configured to store a number of fed sheets in an early failure period, the number of fed sheets in the early failure period being a certain number of fed sheets and being a preset number of fed sheets, which is treated as an early failure where the maintainable component has a failure; and
a controller circuitry configured to
  calculate a failure density depending on a number of fed sheets based on a number of fed sheets at a time when a failure occurred in the maintainable component, which is received from the multiple image forming apparatuses, and
  output information about replacement of the maintainable component based on the failure density to the number of fed sheets in the early failure period from a number of fed sheets at a time when the parameter exceeds the threshold after an operation, which is received from one image forming apparatus.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

In the following embodiment, a "maintainable component" is a "feed roller", an "operation about the maintainable component" is a "feeding (operation)", and a "parameter obtained after an operation" is a "time-length-for-feeding", which are merely examples.

1. Device Management System

Figure 1:
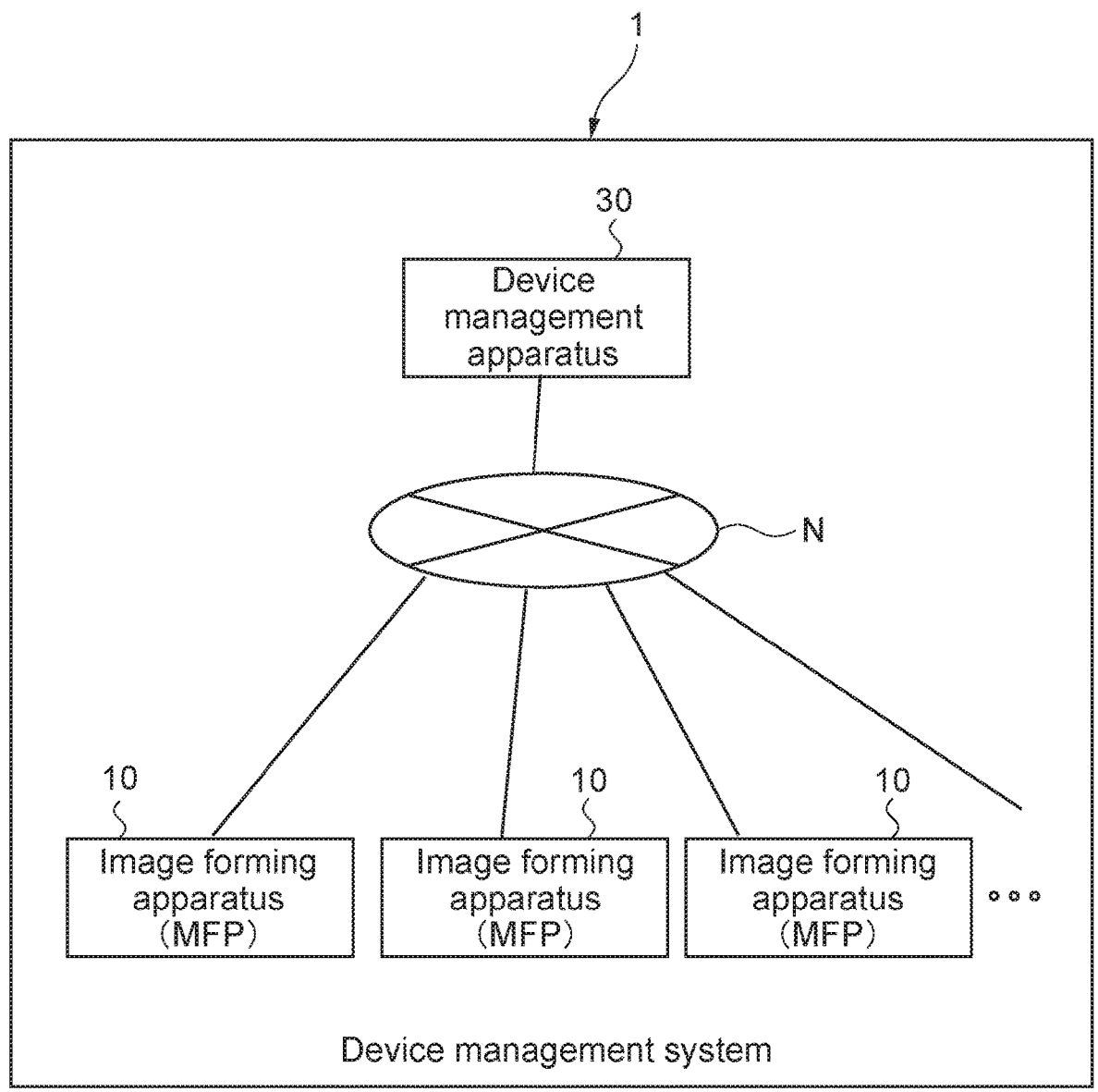
FIG. 1 shows a configuration of a device management system according to an embodiment of the present disclosure.

FIG. 1 shows a configuration of a device management system according to an embodiment of the present disclosure.

The device management system 1 is a computer system in which the multiple image forming apparatuses 10 communicate with the device management apparatus 30 via the network N. The network N is, for example, the Internet. The image forming apparatus 10 is, for example, an MFP (Multifunctional Peripheral). The device management apparatus 30 is a typical computer and functions as a server apparatus.

2. Hardware Configuration of Image Forming Apparatus

Figure 2:
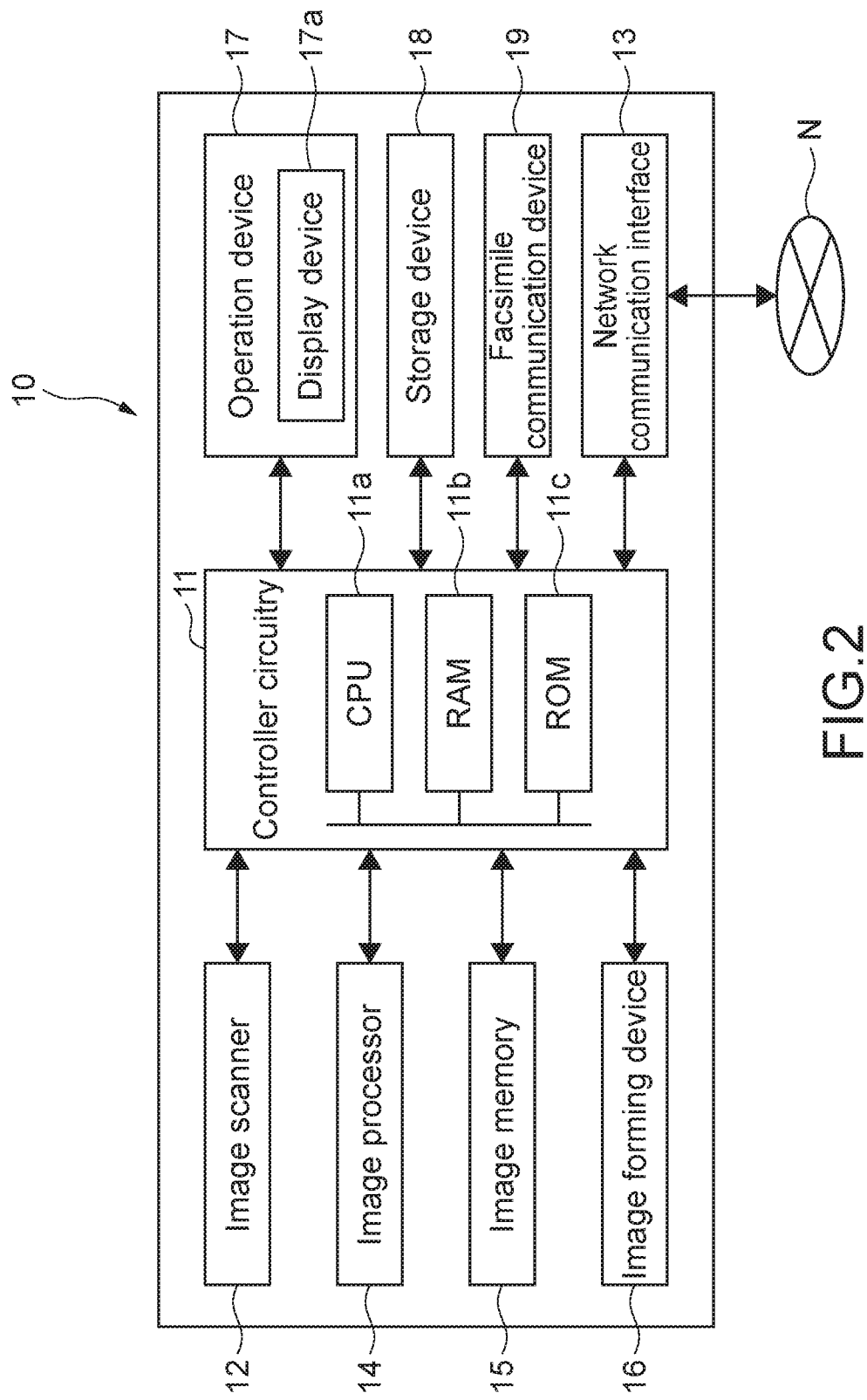
FIG. 2 shows a hardware configuration of an image forming apparatus.

FIG. 2 shows a hardware configuration of an image forming apparatus.

A hardware configuration of the image forming apparatus 10 will be described. The image forming apparatus 10 includes the controller circuitry 11. The controller circuitry 11 includes the CPU (Central Processing Unit) 11a, the RAM (Random Access Memory) 11b, the ROM (Read Only Memory) 11c, dedicated hardware circuitries, and the like and performs overall operational control of the image forming apparatus 10. The CPU 11a loads information processing programs stored in the ROM 11c in the RAM 11b and executes the information processing programs. The ROM 11c is a nonvolatile memory that stores programs executable by the CPU 11a, data, and the like. The ROM 11c is an example of a non-transitory computer readable recording medium.

The controller circuitry 11 is connected to the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Step Solid State Drive), the facsimile communication device 19, the network communication interface 13, and the like. The controller circuitry 11 performs operational control of the respective devices connected thereto and sends/receives signals and data to/from those devices. The operation device 17 (touch panel) is one mode of an input device. A sound input device including a microphone may be provided as an input device.

3. Hardware Configuration of Device Management Apparatus

Figure 3:
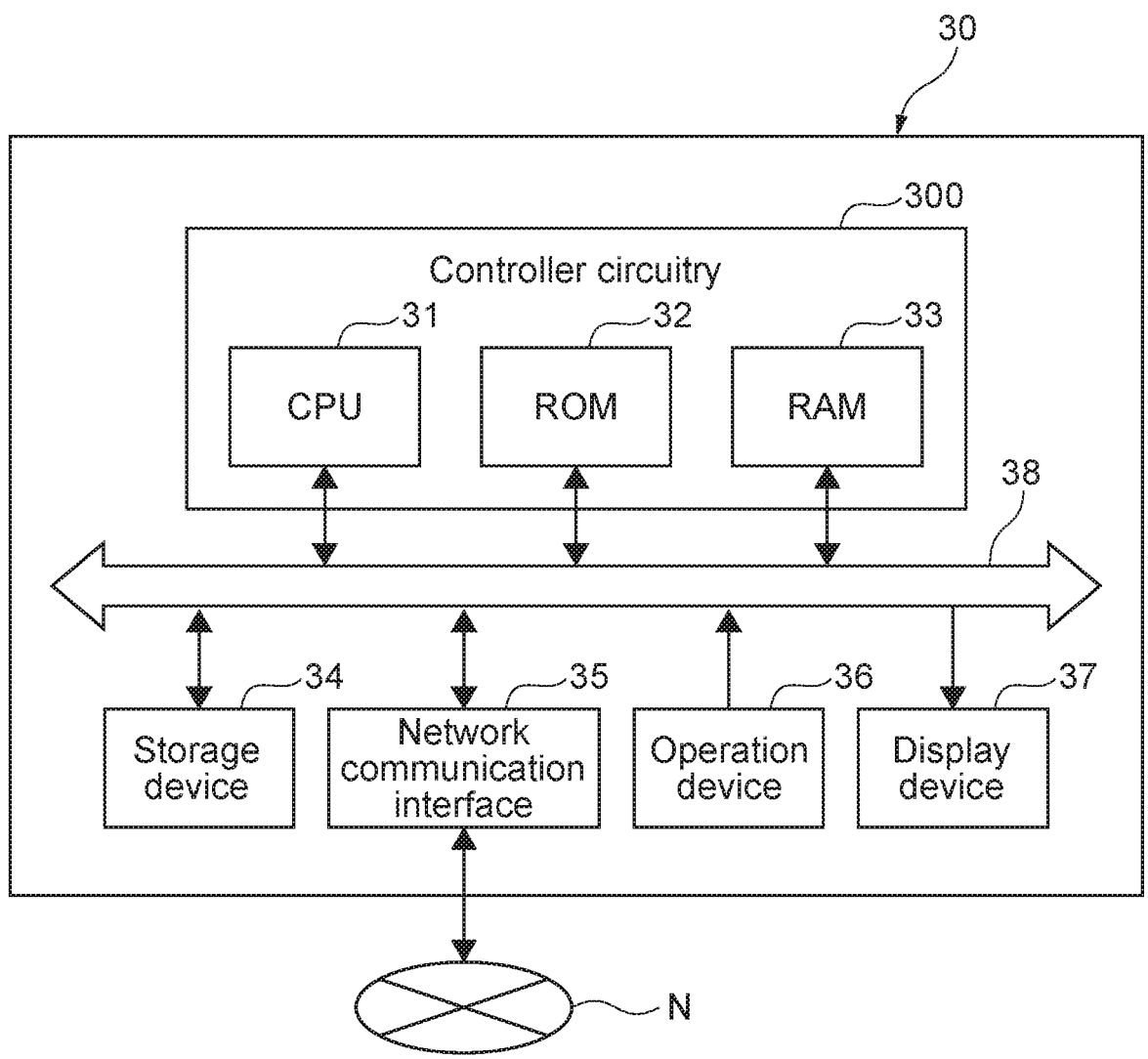
FIG. 3 shows a hardware configuration of a device management apparatus.

FIG. 3 shows a hardware configuration of a device management apparatus.

The device management apparatus 30 includes the CPU 31, the ROM 32, the RAM 33, the storage device 34, which is a large-volume nonvolatile memory such as an HDD or an SSD, the network communication interface 35, the operation device 36, and the display device 37, and the bus 38 connecting them to each other.

The controller circuitry 300 includes the CPU 31, the ROM 32, and the RAM 33. The CPU 31 loads information processing programs stored in the ROM 32 in the RAM 33 and executes the information processing programs. The ROM 32 stores programs executable by the CPU 31, data, and the like nonvolatile. The ROM 32 is an example of a non-transitory computer readable recording medium.

4. Operational Flow of Device Management System

Figure 4:
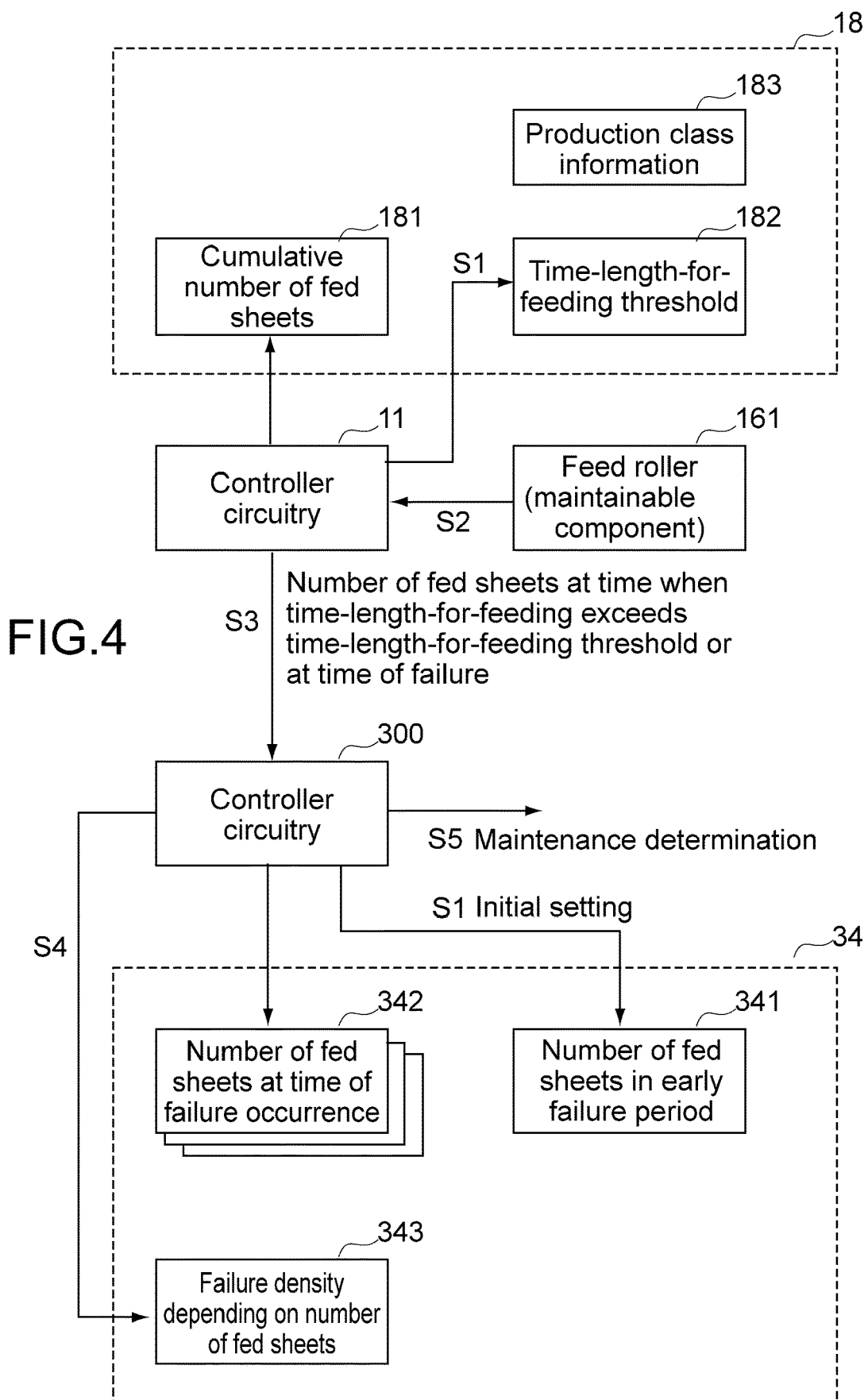
FIG. 4 shows an operational flow of the device management system.

FIG. 4 shows an operational flow of the device management system.

FIG. 4 also shows a functional configuration of the device management system 1. In the image forming apparatus 10, the image forming device 16 includes, as a maintainable component, the feed roller 161. In the image forming apparatus 10, the storage device 18 stores the cumulative number of fed sheets 181, the time-length-for-feeding threshold 182, and the production class information 183.

The feed roller 161 has one of various "production classes". The production class information 183 is information for specifying the production class. The "production class" is for example, a production lot of the feed roller 161. In this case, the production class information 183 is a lot number.

The cumulative number of fed sheets 181 is a counted value of the number of sheets fed into the image forming device 16. The cumulative number of fed sheets 181 is about a number of use of the image forming apparatus 10 by users. In the present embodiment, every time the feed roller 161 is replaced, the cumulative number of fed sheets 181 at the time of replacement is also stored in the storage device 18.

The time-length-for-feeding threshold 182 is a threshold, where a "time-length-for-feeding" is treated as a normal operation as a design specification. The "time-length-for-feeding" is a time length that a sheet travels from a feeder (not shown) to the main part of the image forming device 16 by using the feed roller 161. A manager of the device management system 1 sets a certain value (or range) as the time-length-for-feeding threshold 182.

(Step S1: Initial setting) In the image forming apparatus 10, the controller circuitry 11 stores the time-length-for-feeding threshold 182 in the storage device 18 depending on an operational input of a user input from the operation device 17.

Meanwhile, in the device management apparatus 30, the controller circuitry 300 stores the number of fed sheets in early failure period 341 in the storage device 34, which is specified by the manager of the device management system 1. Note that the image forming apparatus 10 may store the time-length-for-feeding threshold 182 based on a command sent from the device management apparatus 30 to the image forming apparatus 10.

(Step S2: Normal operation) Every time a feed operation using the feed roller 161 is executed in response to an operation input by a user, the controller circuitry 11 detects the "time-length-for-feeding", which is a time length required for the feed operation. Further, the controller circuitry 11 detects whether or not a failure of the feed roller 161 occurs. If a failure of the feed roller 161 is detected, the controller circuitry 11 notifies the device management apparatus 30 of that fact. Also, if the time-length-for-feeding exceeds the time-length-for-feeding threshold 182, the controller circuitry 11 notifies the device management apparatus 30 of that fact.

(Step S3: Notification to device management apparatus) If the feed roller 161 has a failure, the controller circuitry 11 sends a signal, which notifies the device management apparatus 30 of that fact. Also, if the time-length-for-feeding exceeds the time-length-for-feeding threshold 182, the controller circuitry 11 sends a signal, which notifies the device management apparatus 30 of that fact. At those times, the controller circuitry 11 also notifies the device management apparatus 30 of the cumulative number of fed sheets 181 (the cumulative number of fed sheets 181 from the last replacement to the failure) at that time and the production class information 183 of the feed roller 161.

(Step S4: Analysis of failure density) The controller circuitry 300 of the device management apparatus 30 receives the failure notification, and stores the number of fed sheets 342 at the time of the failure occurrence in the storage device 34. The controller circuitry 300 calculates "the failure density depending on the number of fed sheets 343" for each production class specified based on the production class information 183 based on the number of fed sheets 342 at the failure occurrence received from the multiple image forming apparatuses 10. "The failure density depending on the number of fed sheets 343" is represented by the following failure index density function based on the Weibull distribution.

$$f(x) = \frac{\alpha}{\beta}\left(\frac{x}{\beta}\right)^{\alpha-1} \exp\left[-\left(\frac{x}{\beta}\right)^{\alpha}\right] \quad \text{[Math 1]}$$

In the expression, α is a Weibull factor (shape parameter), β is a scale parameter, and x is the number of fed sheets. In other words, x is the cumulative number of fed sheets 181 at the time of a failure of the feed roller 161, which is a maintainable component, from the last replacement to the failure.

(Step S5: Maintenance determination) The device management apparatus 30 receives a notification, which indicates that the time-length-for-feeding exceeds the time-length-for-feeding threshold 182, from the image forming apparatus 10. In this case, the device management apparatus 30 uses the failure density function of the production lot of the feed roller 161, which is used in the image forming apparatus 10. Then the device management apparatus 30 calculates the occurrence probability of early failures until it reaches the number of fed sheets in early failure period 341. In this case, the number of fed sheets in early failure period 341 is, as described above, a certain number of fed sheets and is a preset number of fed sheets, which is treated as an early failure if the feed roller 161 has a failure. In other words, the number of fed sheets in early failure period 341 is the maximum value of the number of fed sheets treated as an early failure period.

Further, the controller circuitry 300 calculates the early failure occurrence probability (in other words, cumulative value of failure density 343) until the number of fed sheets in early failure period is attained (the cumulative number of sheets is reset after replacement) based on the failure density function of the production lot of a replaceable component. The controller circuitry 300 compares the both, and determines that the component should be replaced where the occurrence probability after replacement is lower than the other. Where the early failure occurrence probability after replacement is not lower than the other, the controller circuitry 300 determines that the component should be maintained without replacement.

According to the aforementioned operational flow, the time-length-for-feeding exceeds the time-length-for-feeding threshold 182, i.e., a so-called sign of failure, is detected. At the time of detection, the image forming apparatus 10 notifies the device management apparatus 30 of that fact (Step S2). As a result, the device management apparatus may determine the maintenance before a failure actually occurs (Step S5), and it is possible to prevent occurrence of an early failure and occurrence of downtime resulting from that in advance.

Figure 5:
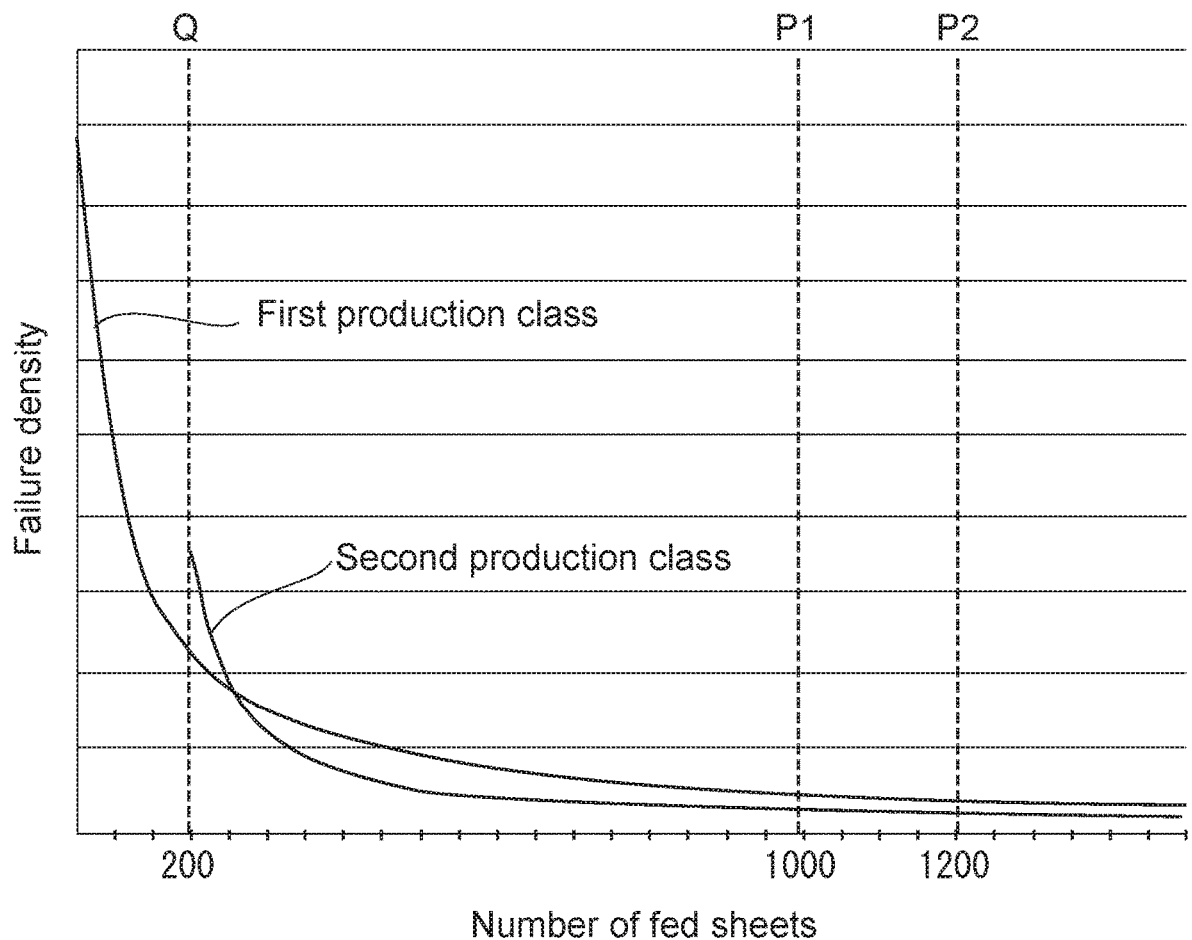
FIG. 5 shows a maintenance determination process based on a failure density and the number of fed sheets.

FIG. 5 shows a maintenance determination process based on a failure density and the number of fed sheets. In FIG. 5, the number of fed sheets in early failure period 341 is "1000 sheets". As shown in FIG. 5, for example, the failure density of the feed roller 161 of the first production class changes depending on the number of fed sheets. As shown in FIG. 5, for example, the failure density of the feed roller 161 of the first production class also changes depending on the number of fed sheets. Note that, typically, the failure density for a while after a maintainable component is replaced (before the early failure period passes) is higher than the failure density after the early failure period passes. After the early failure period passes, the failure density becomes stable.

Hereinafter, the first production class is the "early lot", and the second production class is the "later lot".

In FIG. 5, the time-length-for-feeding exceeds the time-length-for-feeding threshold 182 at the time of feeding the 200th sheet (Q). In this case, in the span Q to P1 (in other words, span from start of use of early lot component to the number of fed sheets in early failure period 341 "1000 sheets"), the cumulative value (area below curve) of the failure density of the early lot is obtained. The cumulative value is the early failure occurrence probability where the early lot component is used without being replaced. Meanwhile, in the span Q to P2 (in other words, where early lot component is replaced by later lot component at time (Q), span from start of use of later lot component to the number of fed sheets in early failure period 341 "1000 sheets"), the cumulative value of the failure density of the later lot is obtained. The cumulative value is the early failure occurrence probability where the early lot component is replaced by the later lot component.

The device management apparatus 30 compares the cumulative value of the failure density in the span Q to P1 against the cumulative value of the failure density in the span Q to P2, and determines maintenance. In the example of FIG. 5, the latter is smaller. So the device management apparatus 30 determines that the early lot component should be replaced by the later lot component.

5. Modification Example

In the present embodiment, the "maintainable component" is a "feed roller", for example. Alternatively, for example, the "maintainable component" may be a "conveyer roller", a "fuser roller", or an "intermediate transfer belt". Where each of them is a maintainable component, for example, the time that takes for a conveyer operation or the time that takes for a fuser operation of fusing a formed image on a sheet may be a "parameter".

6. Conclusion

A "wear-out failure" occurs as a result of wear-out of a maintainable component as a result of printing. With regard to replacement timing, typically, a service person visits a customer site regularly, and then determines whether or not it is necessary to replace a maintainable component. A service person does not want to bring heavy spares for all the maintainable components for regular visits. So the service person has to select necessary maintainable components for replacement based on the service person's experiences and the like.

(1) According to the present embodiment, one image forming apparatus obtains a parameter, the parameter being obtained after an operation, where an operation about the maintainable component is treated as a normal operation. Where the parameter exceeds the threshold, the image forming apparatus sends a cumulative number of fed sheets at that time to a device management apparatus. Meanwhile, the device management apparatus receives a cumulative number of fed sheets at a time when a failure occurred in the maintainable component from the image forming apparatus that has the failure. Based on that, the device management apparatus calculates a failure density depending on a number of fed sheets. The device management apparatus outputs information about replacement of the maintainable component of the one image forming apparatus based on the failure density to the predetermined number of fed sheets in the early failure period from a number of fed sheets at a time when the parameter exceeds the threshold. As a result, according to the present embodiment, information about replacement of a maintainable component may be output appropriately based on an early failure occurrence probability.

(2) According to the present embodiment, the device management apparatus calculates the failure density for each production class (production time, lot, etc.) of the maintainable component. As a result, according to the present embodiment, an early failure occurrence probability, which is different depending on difference of lots of maintainable components, may be calculated. So information about replacement of a maintainable component may be output more appropriately.

(3) According to the present embodiment, the device management apparatus outputs information about replacement of the maintainable component further based on the failure density calculated for the maintainable component of a second production class, the second production class being different from a production class (first production class) of the maintainable component about an operation, where the parameter exceeds the threshold. As a result, according to the present embodiment, production classes of maintainable components are compared against one another. So information about replacement of a maintainable component may be output more appropriately.

It should be understood by those skilled in the art that various modifications, combinations, sub-combinations and alterations may occur depending on design requirements and other factors insofar as they are within the scope of the appended claims or the equivalents thereof

What is claimed is:

1. A device management system, comprising:
multiple image forming apparatuses; and
a device management apparatus communicably connected to the multiple image forming apparatuses via a network,
the image forming apparatus including
a maintainable component being a replaceable component,
a storage device configured to store a threshold of a parameter, the parameter being obtained after an operation, where an operation about the maintainable component is treated as a normal operation, and
a communication device configured to, where the parameter exceeds the threshold after an operation and where the maintainable component has a failure, send a cumulative number of fed sheets at that time to the device management apparatus,
the device management apparatus including
a storage device configured to store a number of fed sheets in an early failure period, the number of fed sheets in the early failure period being a certain number of fed sheets and being a preset number of fed sheets, which is treated as an early failure where the maintainable component has a failure, and
a controller circuitry configured to
calculate a failure density depending on a number of fed sheets based on a number of fed sheets at a time when a failure occurred in the maintainable component, which is received from the multiple image forming apparatuses, and
output information about replacement of the maintainable component based on the failure density to the number of fed sheets in the early failure period from a number of fed sheets at a time when the parameter exceeds the threshold after an operation, which is received from one image forming apparatus.

2. The device management system according to claim 1, wherein
the controller circuitry of the device management apparatus is configured to calculate the failure density for each production class of the maintainable component.

3. The device management system according to claim 2, wherein
the controller circuitry of the device management apparatus is configured to output information about replacement of the maintainable component further based on the failure density calculated for the maintainable component of a second production class, the second production class being different from a first production class of the maintainable component about an operation, where the parameter exceeds the threshold.

4. A device management apparatus, comprising:
a communication device configured to communicably connected to an image forming apparatus via a network,
the image forming apparatus including
a maintainable component being a replaceable component,
a storage device configured to store a threshold of a parameter, the parameter being obtained after an operation, where an operation about the maintainable component is treated as a normal operation, and
a communication device configured to, where the parameter exceeds the threshold after an operation and where the maintainable component has a failure, send a cumulative number of fed sheets at that time to the device management apparatus;
a storage device configured to store a number of fed sheets in an early failure period, the number of fed sheets in the early failure period being a certain number of fed sheets and being a preset number of fed sheets, which is treated as an early failure where the maintainable component has a failure; and
a controller circuitry configured to
calculate a failure density depending on a number of fed sheets based on a number of fed sheets at a time when a failure occurred in the maintainable component, which is received from the multiple image forming apparatuses, and
output information about replacement of the maintainable component based on the failure density to the number of fed sheets in the early failure period from a number of fed sheets at a time when the parameter exceeds the threshold after an operation, which is received from one image forming apparatus.

* * * * *